US010775512B2

(12) United States Patent
Babitch et al.

(10) Patent No.: US 10,775,512 B2
(45) Date of Patent: Sep. 15, 2020

(54) METHOD AND APPARATUS FOR SECOND ORDER INTERCEPT POINT (IP2) CALIBRATION

(71) Applicant: Samsung Electronics Co., Ltd., Gyeonggi-do (KR)

(72) Inventors: Daniel Babitch, San Jose, CA (US); Andrea Y. Chen, San Jose, CA (US); Chung Lau, Sunnyvale, CA (US); Bhaskar Nallapureddy, San Jose, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/429,742

(22) Filed: Jun. 3, 2019

(65) Prior Publication Data

US 2019/0285755 A1 Sep. 19, 2019

Related U.S. Application Data

(63) Continuation of application No. 15/207,995, filed on Jul. 12, 2016, now Pat. No. 10,317,535.

(60) Provisional application No. 62/316,047, filed on Mar. 31, 2016.

(51) Int. Cl.
*G01S 19/23* (2010.01)
*G01S 19/21* (2010.01)

(52) U.S. Cl.
CPC ............ *G01S 19/235* (2013.01); *G01S 19/21* (2013.01)

(58) Field of Classification Search
CPC ........ H04B 1/30; H04B 17/21; H04B 1/7097; H04B 2201/698; H04B 2201/709718
See application file for complete search history.

(56) References Cited

U.S. PATENT DOCUMENTS

| | | |
|---|---|---|
| 5,579,347 A | 11/1996 | Lindquist et al. |
| 6,134,430 A | 10/2000 | Younis et al. |
| 6,366,622 B1 | 4/2002 | Brown et al. |

(Continued)

FOREIGN PATENT DOCUMENTS

| | | |
|---|---|---|
| EP | 1 786 097 | 5/2007 |

OTHER PUBLICATIONS

Barend Van Liempd, "IIP2 and HR Calibration for an 8-Phase Harmonic Recombination Receiver in 28nm", Copyright 2013 IEEE, pp. 4.

(Continued)

*Primary Examiner* — Sung S Ahn
(74) *Attorney, Agent, or Firm* — The Farrell Law Firm, P.C.

(57) ABSTRACT

An electronic device, a method, and a chipset for receiving global navigation satellite system (GNSS) signals are provided. The electronic device includes a processor configured to: downconvert, by an input/output (I/O) mixer including a first multiplier and a second multiplier, a modulated radio frequency wave to an intermediate frequency, where the modulated radio frequency wave is input to first inputs of the first multiplier and the second multiplier, and where an in-phase signal and a quadrature phase signal based on a square wave are input to second inputs of the first multiplier and the second multiplier, respectively; filter the downconverted modulated radio frequency wave; and convert the filtered downconverted modulated radio frequency wave to a digital signal.

20 Claims, 8 Drawing Sheets

(56) References Cited

U.S. PATENT DOCUMENTS 7,251,468 B2 7/2007 Ruelke et al.
10,317,535 B2 * 6/2019 Babitch ................. G01S 19/235
2003/0176174 A1 9/2003 Seppinen et al.
2004/0004674 A1 1/2004 Birleson
2005/0260962 A1 11/2005 Nazrul et al.
2006/0014515 A1 1/2006 Ruelke et al.
2007/0105522 A1 5/2007 Muhammad et al.
2007/0259642 A1 11/2007 Pullela et al.
2007/0275674 A1 11/2007 Chien
2008/0292022 A1 * 11/2008 Blum ........................ H03L 7/07
375/317
2009/0085645 A1 4/2009 Tanaka
2009/0186587 A1 * 7/2009 Sobchak .................. H04B 1/30
455/196.1
2009/0202022 A1 8/2009 Kaczman et al.
2009/0213770 A1 8/2009 Mu
2009/0227214 A1 9/2009 Georgantas et al.
2009/0322418 A1 * 12/2009 Burke .................. H03H 15/023
327/552
2010/0120369 A1 5/2010 Ko et al.
2011/0076961 A1 3/2011 Feng et al.
2011/0128992 A1 6/2011 Maeda et al.
2011/0275341 A1 11/2011 Landmark
2014/0171007 A1 * 6/2014 Nentwig .................. H04B 1/10
455/317
2015/0180423 A1 6/2015 Sankaranarayanan
2015/0349724 A1 12/2015 Wang et al.

OTHER PUBLICATIONS

Taiwanese Office Action dated Jun. 30, 2020 issued in counterpart application No. 105141659, 6 pages.

* cited by examiner

METHOD AND APPARATUS FOR SECOND ORDER INTERCEPT POINT (IP2) CALIBRATION

PRIORITY

This application is a Continuation Application of U.S. patent application Ser. No. 15/207,995, which was filed in the U.S. Patent and Trademark Office on Jul. 12, 2016, which claimed priority under 35 U.S.C. § 119(e) to U.S. Provisional Patent Application No. 62/316,047, which was filed in the U.S. Patent and Trademark Office on Mar. 31, 2016, the entire contents of each of which are incorporated herein by reference.

FIELD

The present disclosure generally relates to global navigation satellite system (GNSS) receivers, and more particularly, to a method and apparatus for second order intercept point (IP2) calibration.

BACKGROUND

Users of electronic devices require increasing functionality in the applications and services provided by the electronic devices and communication networks used to connect those devices. Providing reliable location based services simultaneously with high bandwidth cellular data services is of increasing importance for user satisfaction. One of the challenges faced by the GNSS receivers which support location based services in electronic devices is to increase the signal processing performance of the GNSS receivers in the presence of strong interference signals generated by the cellular uplink transmitters and miscellaneous clock sources in the electronic device.

SUMMARY

An aspect of the present disclosure provides a method and apparatus for calibration of the receive signal path in GNSS receivers in the presence of blocking interference resulting from uplink cellular radio transmissions and other clock sources.

According to an aspect of the present disclosure an electronic device is provided. The electronic device includes a processor configured to downconvert, by an input/output (I/O) mixer including a first multiplier and a second multiplier, a modulated radio frequency wave to an intermediate frequency, where the modulated radio frequency wave is input to first inputs of the first multiplier and the second multiplier, and where an in-phase signal and a quadrature phase signal based on a square wave are input to second inputs of the first multiplier and the second multiplier, respectively; filter the downconverted modulated radio frequency wave; and convert the filtered downconverted modulated radio frequency wave to a digital signal.

According to an aspect of the present disclosure a method is provided. The method includes downconverting, by an I/O mixer including a first multiplier and a second multiplier, a modulated radio frequency wave to an intermediate frequency, where the modulated radio frequency wave is input to first inputs of the first multiplier and the second multiplier, and where an in-phase signal and a quadrature phase signal based on a square wave is input to second inputs of the first multiplier and the second multiplier, respectively; and filtering the downconverted modulated radio frequency wave.

According to an aspect of the present disclosure a chipset for receiving global navigation satellite system (GNSS) signals is provided. The chipset is configured to downconvert, by an I/O mixer including a first multiplier and a second multiplier, a modulated radio frequency wave to an intermediate frequency, where the modulated radio frequency wave is input to first inputs of the first multiplier and the second multiplier, and where an in-phase signal and a quadrature phase signal based on a square wave are input to second inputs of the first multiplier and the second multiplier, respectively; and filter the downconverted modulated radio frequency wave.

BRIEF DESCRIPTION OF THE DRAWINGS

The above and other aspects, features and advantages of the present disclosure will become more apparent from the following detailed description, when taken in conjunction with the accompanying drawings, in which.

DETAILED DESCRIPTION

Figure 1:
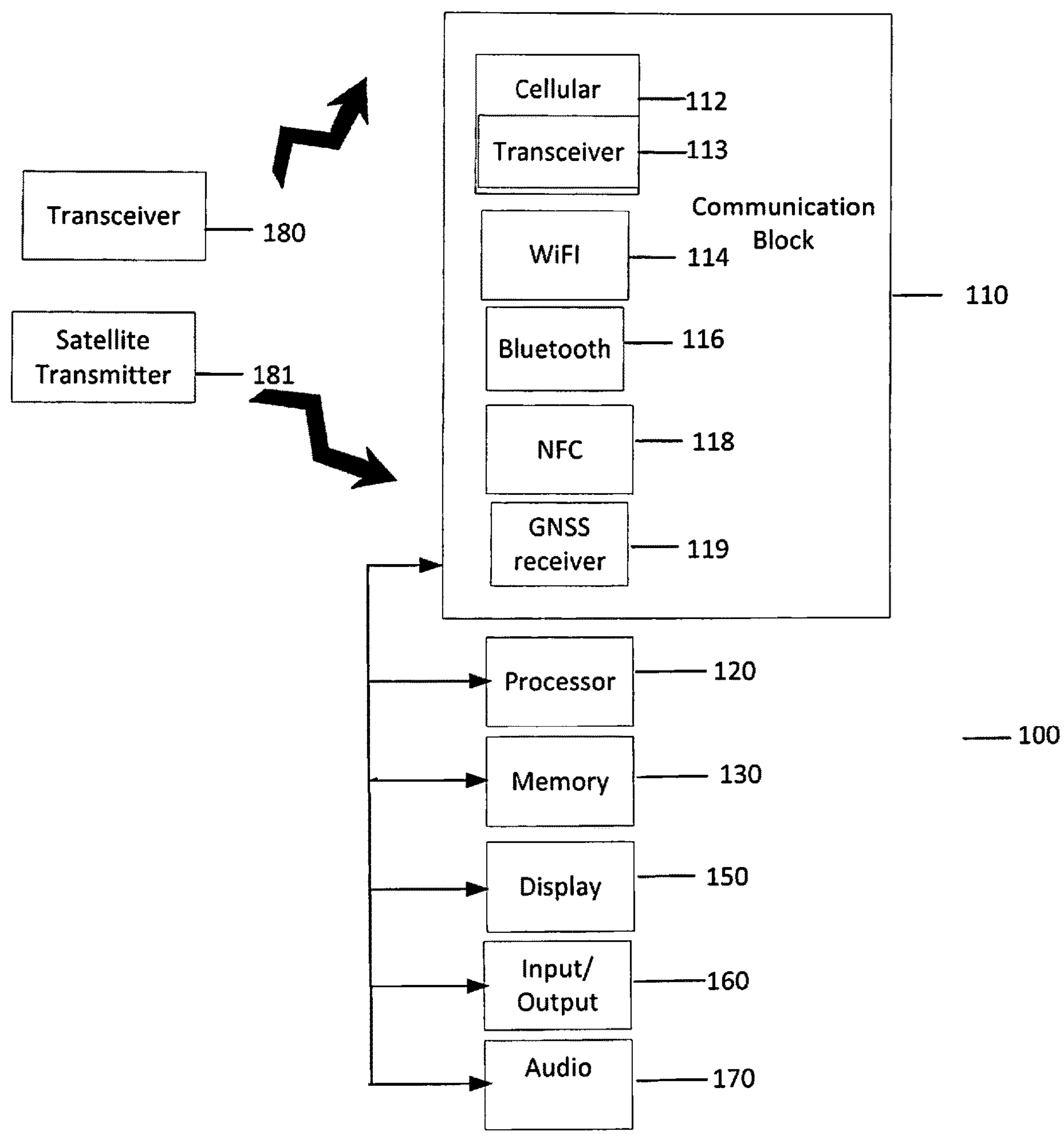
FIG. 1 is a block diagram of an electronic device in a network environment, according to an embodiment of the present disclosure.

The present disclosure will now be described more fully hereinafter with reference to the accompanying drawings, in which embodiments of the present disclosure are shown. This disclosure may, however, be embodied in many different forms and should not be construed as limited to the embodiments set forth herein. Rather, these embodiments are provided so that this disclosure will be thorough and complete, and will fully convey the scope of the device and method to those skilled in the art. In the drawings, the size and relative sizes of layers and regions may be exaggerated for clarity. Like reference numbers refer to like elements throughout.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. As used herein, the term "and/or" includes, but is not limited to, any and all combinations of one or more of the associated listed items.

It will be understood that, although the terms first, second, and other terms may be used herein to describe various elements, these elements should not be limited by these terms. These terms are only used to distinguish one element from another. For example, a first signal may be referred to as a second signal, and, similarly, a second signal may be referred to as a first signal without departing from the teachings of the disclosure.

The terminology used herein is for the purpose of describing particular embodiments only and is not intended to be limiting of the present device and method. As used herein, the singular forms "a", "an" and "the" are intended to include the plural forms as well, unless the context clearly indicates otherwise. It will be further understood that the terms "comprises" and/or "comprising," or "includes, but is not limited to" and/or "including, but not limited to" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including, but not limited to technical and scientific terms) used herein have the same meanings as commonly understood by one of ordinary skill in the art to which the present device and method belongs. It will be further understood that terms, such as those defined in commonly used dictionaries, should be interpreted as having meanings that are consistent with their meaning in the context of the relevant art and/or the present description, and will not be interpreted in an idealized or overly formal sense unless expressly so defined herein.

FIG. 1 is a block diagram of an electronic device in a network environment, according to an embodiment of the present disclosure.

Referring to FIG. 1, an electronic device 100 includes, but is not limited to, a communication block 110, a processor 120, a memory 130, a display 150, an input/output block 160, an audio block 170, a transceiver 180 and a satellite transmitter 181.

The electronic device 100 includes, a communication block 110 for connecting the device 100 to another electronic device or a network for communication of voice and data. The communication block 110 provides cellular, wide area, local area, personal area, near field, device to device (D2D), machine to machine (M2M), satellite and short range communications. The functions of the communication block 110, or a portion thereof including the GNSS receiver 119, may be implemented by a chipset. In particular, the cellular communications block 112 provides a wide area network connection through terrestrial base transceiver stations or directly to other electronic devices, using technologies such as D2D, M2M, long term evolution (LTE), fifth generation (5G), long term evolution advanced (LTE-A), code division multiple access (CDMA), wideband code division multiple access (WCDMA), universal mobile telecommunications system (UMTS), wireless broadband (WiBro), and global system for mobile communication (GSM). The cellular communications block 112 includes, but is not limited to, a chipset and a transceiver 113. The wireless fidelity (WiFi) communications block 114 provides a local area network connection through network access points using technologies such as IEEE 802.11. The Bluetooth communications block 116 provides personal area direct and networked communications using technologies such as IEEE 802.15. The near field communications (NFC) block 118 provides point to point short range communications using standards such as ISO/IEC 14443. The communication block 110 also includes, a GNSS receiver 119. The GNSS receiver 119 may support receiving signals from the satellite transmitter 181. The satellite transmitter 181 may be associated with at least one of, for example, a global positioning system (GPS), a global navigation satellite system (Glonass), a Beidou navigation satellite system (Beidou), and a European global satellite-based navigation system (Galileo). The GNSS receiver 119 provides for receiving satellite signals in order to compute the absolute position, velocity, acceleration and time of the electronic device 100. The GNSS receiver 119 may include at least one of a processor, a receiver, a low noise amplifier, a downconverter, a mixer, a DAC, an analog to digital converter (ADC), a temperature measuring device, a filter, an accumulator, a calibration circuit, a storage, a reference frequency oscillator (such as a temperature compensated crystal oscillator (TCXO) a temperature sensed crystal, or a bare crystal with no temperature sensor), a square wave generator, a ring oscillator, a radio frequency integrated circuit (RFIC), and a baseband integrated circuit (BBIC). The electronic device 100 may receive electrical power for operating the functional blocks from a power supply, including, but not limited to a battery. The transceiver 180 may be a part of a terrestrial base transceiver station (ex. cellular base station (BTS)) and include a radio frequency transmitter and receiver conforming to cellular standards.

The processor 120 provides application layer processing functions required by the user of the electronic device 100. The processor 120 also provides command and control functionality for the various blocks in the electronic device 100. The processor 120 provides for updating control functions required by the functional blocks. The processor 120 may provide for coordination of resources required by the transceiver 113 including, but not limited to communication control between the functional blocks. The processor 120 may also update the firmware, databases, lookup tables, calibration method programs and libraries associated with the GNSS receiver 119. The cellular communications block 112 may also have a local processor or a chipset which dedicates computing resources to the GNSS receiver 119 and other functional blocks required for satellite signal reception.

The memory 130 provides storage for device control program code, user data storage, application code and data storage. The memory 130 may provide data storage for the firmware, libraries, databases, lookup tables, I and Q mixer imbalance data and other calibration data required by the GNSS receiver 119. The databases may include look up tables, and the like. The program code and databases required by the GNSS receiver 119 may be loaded into local storage within the GNSS receiver 119 from the memory 130 upon device boot up. The GNSS receiver 119 may also have local, volatile and non-volatile memory for storing the program code, libraries, databases, calibration data and lookup table data.

The display 150 may be a touch panel, and may be embodied as an LCD, LED, OLED, AMOLED, and the like. The input/output block 160 controls the interface to the user of the electronic device 100. The audio block 170 provides for audio input and output to/from the electronic device 100.

The GNSS receiver 119 receives satellite signals from the satellite transmitter 181 which are very weak and below the thermal noise level of the GNSS receiver 119. Since the received satellite signals which carry the information required for computing navigation parameters is obscured within the noise, in the absence of blocking signals, the dynamic range of the receiver components within the GNSS receiver 119 is determined by thermal noise statistics. In other words, the linearity requirements of the GNSS receiver 119 components are not stringent. However, strong blocking (interference) signals such as those due to the transmission of cellular uplink signals from the cellular transceiver 113 may severely desensitize the receiver components within the GNSS receiver 119 due to nonlinear conversions. Therefore, in order to minimize the performance impact to the GNSS receiver 119 in the presence of strong blockers such as cellular uplink transmission signals, the linearity characteristics of the GNSS receiver 119 need to be optimized.

According to an embodiment of the present disclosure, a calibration method for reducing the second order non-linearity in the GNSS receiver 119 reduces the impact of blockers such as the transmission of cellular uplink signals from the cellular transceiver 113 on GNSS signal reception.

Figure 2:
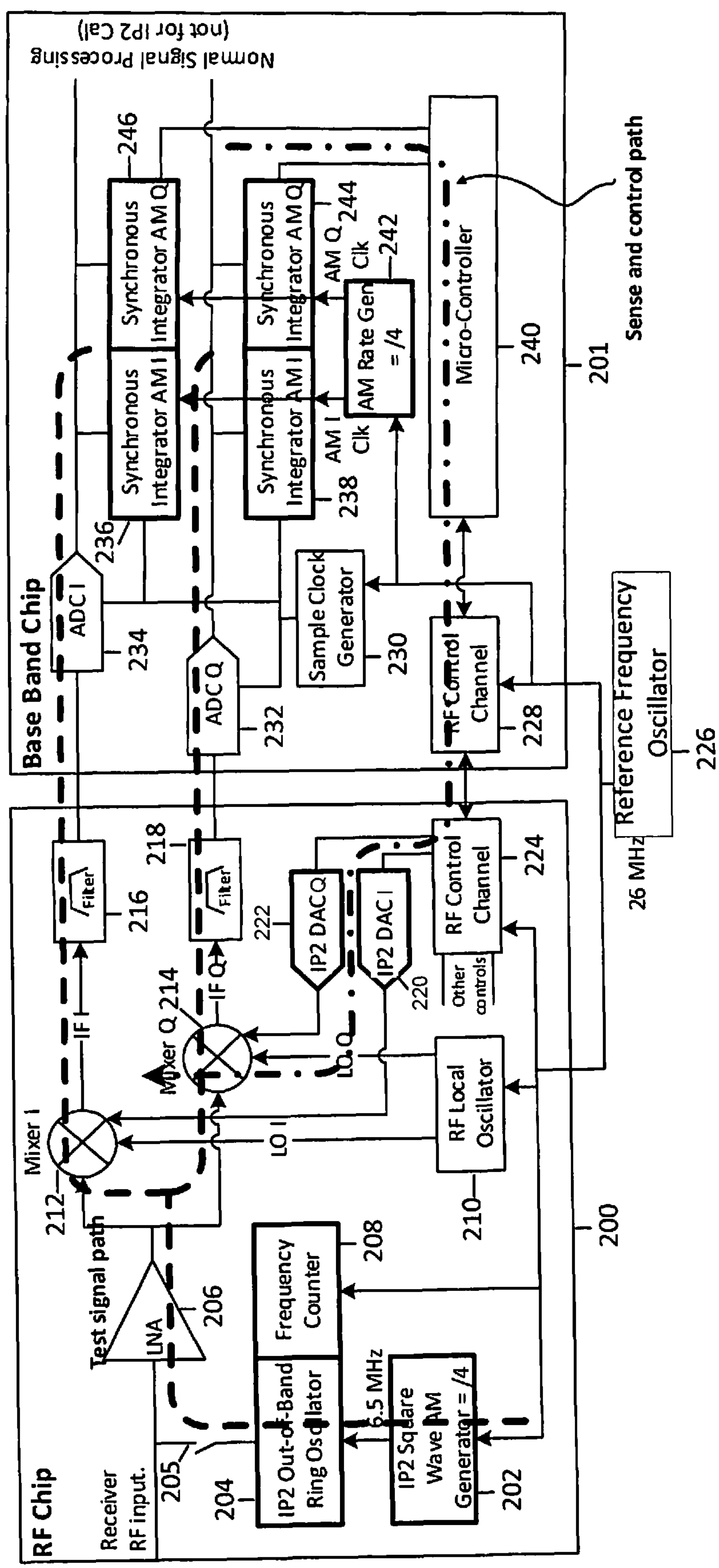
FIG. 2 is a block diagram of a GNSS receiver, according to an embodiment of the present disclosure.

FIG. 2 is a block diagram of a GNSS receiver, according to an embodiment of the present disclosure.

Referring to FIG. 2, a primary contributor of the second order non-linearity within the receiver components of the GNSS receiver 119 are the mixers 212, 214 which provide a down conversion of the frequency of the signal. The mixers 212, 214 convert the amplified radio frequency (RF) input signal into an intermediate frequency (IF). The mixers 212, 214 may be alternating current (AC) coupled and well-balanced resulting in favorable second order non-linearity characteristics. However, imbalance in the mixers 212, 214 may result in unfavorable non-linearity characteristics. The mixers 212, 214 form a complex mixer which produce a complex signal including two output channels IF I and IF Q respectively, where I represents an in-phase signal and Q represents a quadrature signal out of phase by 90 degrees from the I signal. Mixer 212 receives a local oscillator input (LO) I and mixer 214 receives a local oscillator input (LO) Q. The LO I and LO Q signals are of the same frequency and duty cycle with a phase shift of 90 degrees between the two signals.

According to an embodiment of the present disclosure, the imbalances in the mixers 212, 214 are reduced by controlling the mixers through providing direct current (DC) analog biasing signals produced by digital to analog converters (DAC) 220, 222. Alternatively the biasing signals may be added to the LO I and LO Q signals. The LO I and LO Q signals have suitable rise and fall times to provide LO variation of time-high and time-low as seen at the mixers switching thresholds. The LO duty cycle may have the same effect on adjusting IP2 as mixer bias controls.

Programming of the DACs 220, 222 produces the DC analog biasing signals. The calibration method described below results in determining the optimal DAC codes that produce the DC analog bias signals to the mixers 212, 214 which minimizes the mixer imbalance resulting in minimized second order products produced by the mixers 212, 214. Due to the implementation and circuit topology of the mixers, DC bias signals to the mixers 212, 214 from the DACs 220, 222 will also affect the imbalance of the other mixer. Such cross-coupling effects have to be taken account of in an effective IIP2 calibration method. Therefore, the calibration method for finding the optimum DAC codes which produce the optimum bias signals for both mixers requires a method which considers the cross-coupling interaction between the mixers. Further, the optimum DAC codes may be a function of other variables including, but not limited to, die temperature of the IC, process variation in the manufacturing of the IC, and power supply fluctuation. The calibration method for balancing the mixers 212, 214 may be executed at power up, reboot of the GNSS receiver 119 or when the temperature conditions change more than a predefined threshold. A local temperature measurement device may monitor the temperature of the GNSS receiver 119 to assist in determining when recalibration is required.

The non-linearity characteristic of receiver components in the GNSS receiver 119 may be modeled as a transform (or a function) as shown in Equation (1) below:

$$f(x)=a0+a1*x+a2*\times 2+a3*\times 3+ \quad (1)$$

Within the GNSS receiver 119, the higher order coefficients of Equation (1) may be relatively small compared to a1. In a perfectly balanced, AC-coupled implementation, the even coefficients (a0, a2, . . . ) are zero, and the dominant contributor to the non-linearity is the third order term a3. However, it is difficult to achieve no imbalance, and therefore, the second order term also contributes to performance degradation due to non-linearity. The imbalance is particularly severe in zero-IF and low-IF receivers. Further, second order non-linearity may cause a strong direct current (DC) and second order intermodulation product (IM2), which may degrade the IF signal quality.

According to an embodiment of the present disclosure, using Equation (1) as a model for the non-linearity characteristic of the GNSS receiver 119, the calibration method disclosed herein modifies the balance term a2 of Equation (1) by determining the optimum codes for DACs 220, 222, which produce DC biasing voltages provided to the mixers 212, 214 that minimizes the imbalance in the mixers 212, 214. The calibration method minimizes the term a2 by adjusting the DAC codes which provide the DC bias voltages to the mixers 212, 214.

In an embodiment of the present disclosure, the GNSS receiver 119 includes an RF receiver chip 200 and a baseband chip 201. In an embodiment of the present disclosure, the functionality of the RF receiver chip 200 and the functionality of the baseband chip 201 are combined into a single chip. The interface between the RF receiver chip 200 and the baseband chip 201 may include analog intermediate frequency (IF) signals and a digital RF control channel. The digital RF control channel enables control messages and data to be transferred between the RF chip 200 and the baseband chip 201. The RF control channel unit 224 in the RF chip communicates with the RF control channel unit 228 in the baseband chip to transfer the control messages and data. The present method minimizes the pin count required between the RF receiver chip 200 and the baseband chip 201 by using a single reference frequency oscillator 226 (e.g., a temperature compensated crystal oscillator (TCXO)) and providing the output of the reference frequency oscillator 226 to both the RF receiver chip 200 and the baseband chip 201.

The GNSS receiver 119 includes a test signal path and a sense and control signal path. The calibration method of the GNSS receiver 119 uses both the test signal path and the sense and control signal path. Within the test signal path, a square wave generated by the square wave generator 202 amplitude modulates an RF ring oscillator 204 to provide the test signal. The test signal is fed from the RF ring oscillator 204 to the low noise amplifier (LNA) 206 through the RF switch 205. During performance of the calibration method, the RF switch 205 is closed to allow the test signal to pass through to the LNA and power is supplied from the oscillator power supply to the square wave generator 202 to turn on the test signal. During normal operation of the GNSS receiver (non-calibration mode), the RF switch 205 is open to minimize disturbance of tuning the receive signals at the LNA input. In addition, the test signal power is turned off. Thus, no test signal is generated. During calibration, the RF switch 205 is closed. The oscillator frequency from the RF ring oscillator 204 may be calibrated with a frequency counter 208 when the modulation from the square wave generator 202 is turned off, in order to adjust the frequency from the RF ring oscillator 204 to be in a suitable out-of-band frequency (the frequency of the RF ring oscillator is sufficiently far from the frequency band the GNSS receiver receives during normal operation) so that the down-converted carrier will not saturate the filters 216, 218 and the ADCs 232, 234. The modulated signal from the RF ring oscillator 204 is input to the low noise amplifier (LNA) 206, but may alternatively be connected to the LNA 206 output, thereby bypassing the LNA 206 amplification stage.

According to an embodiment of the present disclosure, a two-tone source may be used in place of the square wave AM modulated ring oscillator 204. The RF I and RF Q mixers 212, 214 may down-convert the signals using the RF local oscillator 210. The I and Q mixers 212, 214 may be imbalanced and generate a square wave at their outputs. The I and Q mixers 212, 214 output are amplified and filtered by the filters 216, 218 in the RF receiver chip 200. The filters 216, 218 prevent the down-converted test RF signal from reaching the baseband chip 201, but the AM square wave is in-band because the AM test frequency is in-band and the test RF frequency is out-of-band. The LNA 206 and I and Q mixers 212, 214 are wide band. After amplifying and filtering the analog IF signals, the analog IF signals are output from the RF receiver chip 200 and input to the baseband chip 201. In the baseband chip 201, the analog IF signals are converted to digital signals, digitized IF-I and digitized IF-Q, by the ADCs 232, 234. The ADCs 232, 234 convert the analog signals to digital signals at a rate controlled by the sample clock generator 230. To facilitate computation, the ADC sampling rate is chosen to be an integer multiple of the AM rate. In an embodiment of the present disclosure, the functionality of the RF receiver chip 200 and the functionality of the baseband chip 201 are combined into a single chip In the baseband chip 201, the digitized IF-I signal from ADC 234 is electrically coupled to synchronous integrators 236, 246 and the digitized IF-Q signal from ADC 232 is electrically coupled to synchronous integrators 238, 244. The synchronous integrators 236, 238, 244 and 246 are clocked at the AM rate and function as bandpass filters centered at the AM frequency with a bandwidth of 1/integration time. By using long accumulations the effective signal to noise ratio performance of the calibration method may be improved. The synchronous integrators accumulation length may be 2^n cycles of the AM clock frequency. Each pair of synchronous integrators 236, 246 and 238, 244 use an AM I clock and an AM Q clock. The AM I and AM Q clocks have a 90 degree phase difference and are clocked at the AM clock rate. The synchronous integrators may alternatively be embodied as a Goertzel algorithm. The Goertzel algorithm is a reduced computational complexity fast Fourier transform which detects a single frequency.

The following describes the sense and control path of the calibration method. Referring to FIG. 2, the microcontroller 240 (or another processor such as a dedicated state machine) combines the outputs of the AM I and AM Q synchronous integrator pair. The microcontroller 240 measures the combined outputs of the AM I and AM Q synchronous integrator pair which is independent of the phase error between the test signal modulation phase and the synchronous integrator clock phase. This measurement is done separately for the RF I and RF Q channels.

The microcontroller 240 performs a search for minimization of the mixer imbalance by adjusting the I DAC 220 and the Q DAC 222 so that the balance of both mixers 212, 214 is simultaneously minimized even though the RF I and RF Q mixers dynamically interact with each other due to non-perfect isolation of the two mixers that is typical in passive mixers. Adjusting the balance of one mixer alone may cause the balance point of the other mixer to change even though the DAC setting of the other mixer was not changed. According to an embodiment of the present disclosure, the simultaneous adjustment of the DACs 220, 222 results in the minimization of the mixer imbalance.

The calibration signal is a square wave which on/off modulates an out of band carrier. The square wave modulation signal may be at a frequency of 6.5 MHz and may be generated by the square wave generator 202 dividing the 26 MHz signal from the reference frequency oscillator 226 by 4. Therefore, the 6.5 MHz signal may be generated in both the RF receiver chip 200 and the baseband chip 201. However, the phases of the signals output from the square wave generators 202, 242 may not be identical or repeatable. For example, a divide-by-4 circuit such as the square wave generator 202 or 204 may have 4 phases of output depending on flip-flop startup timing and reference frequency oscillator 226 phasing. The present method does not require correct phasing of the clock in the RF receiver chip 200 and in the baseband chip 201.

According to an embodiment of the present disclosure, the calibration of the GNSS receiver 119 does not require passing a clock AM signal between the baseband chip 201 and the RF receiver chip 200. Further, the calibration method does not require a group delay calibration in order to synchronize the clock signals between the baseband chip 201 and the RF receiver chip 200. The AM frequency of 6.5 MHz is separately generated in the baseband chip 201 and the RF receiver chip 200. The frequency dividers 202, 242 in the RF receiver chip 200 and the baseband chip 201 respectively, may have a different phase of a 6.5 MHz output with no degradation of the calibration performance. It is noted that the present system and method is applicable where the functionality of the RF receiver chip 200 and the functionality of the baseband chip 201 are on a single chip, without deviating from the scope of the present disclosure.

The choice of AM frequency includes, but is not limited to, 6.5 MHz. However, the AM frequency must be the same in the baseband chip 201 and the RF receiver chip 200. The AM frequency must also be within the bandwidth of the IF range. A divided reference frequency oscillator 226 signal satisfies these requirements. The present method does not require a controlled phase relationship of the AM modulation between the baseband chip 201 and the RF receiver chip 200 but still provides high calibration performance.

Figure 3:
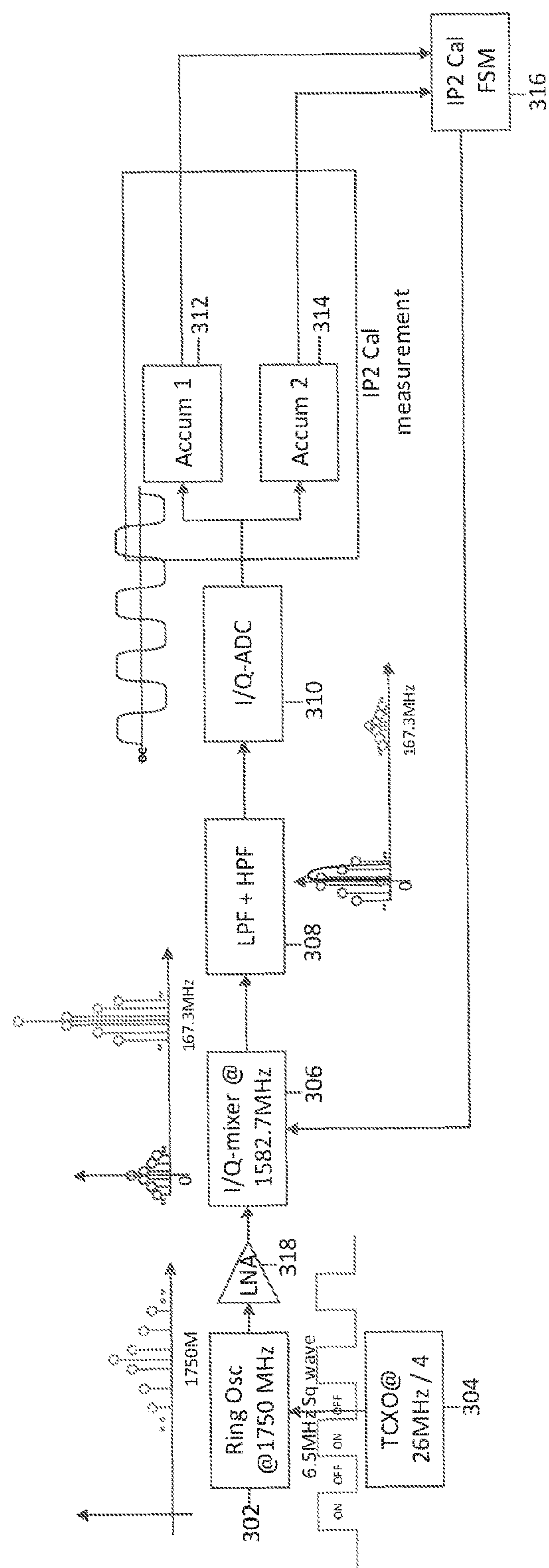
FIG. 3 illustrates a block diagram for calibrating a GNSS receiver, according to an embodiment of the present disclosure.

FIG. 3 illustrates a block diagram for calibrating a GNSS receiver, according to an embodiment of the present disclosure.

Referring to FIG. 3, a square wave is generated at a frequency of 6.5 MHz by dividing the 26 MHz clock from the reference frequency oscillator 226 by 4 in frequency divider 304. The 6.5 MHz signal and an oscillation frequency of 1750 MHz provided by a ring oscillator 302 are fed as inputs into an OR gate or an AND gate (not shown in FIG. 3) within the ring oscillator 302. The output of the OR gate (or AND gate) within the ring oscillator 302 is an AM on/off modulated signal, with a carrier frequency at 1750

MHz carrier signal (switched on and off) at an AM rate of 6.5 MHz. The AM on/off modulated signal is then fed into the input of the LNA 318. The output of the LNA 318 is fed into the I/Q mixer 306. The I/Q mixer 306 is also fed with a frequency of 1582.7 MHz at its LO (local oscillator) ports. Therefore, the first order output signal from the I/Q mixer 306 has a component at 167.3 MHz. The second order output has a component at 6.5 MHz. Further, the low pass filter and high pass filter (LPF+HPF) 308 receives the output from the I/Q mixer 306 and rejects the fundamental and higher harmonics frequencies. The first harmonic and the third harmonic frequencies of the 6.5 MHz square wave fall within the baseband frequency range. The first harmonic and the third harmonic frequencies of the 6.5 MHz square wave along with the attenuated DC signal and higher order harmonics are provided as inputs to the I/Q ADC 310. Accumulator 1 312 measures the I output of the I/Q ADC 310 and accumulator 2 314 measures the Q output of the I/Q ADC 310. The calibration finite state machine IP2 cal FSM 316 determines the relative imbalance of the I and Q mixer 306 and provides a biasing signal to the I and Q mixer 306 which minimizes the imbalance.

The input to the LNA 318 may be modeled as a signal described by Equation (2) below:

$$x(t)=s(t)\cdot\cos(wrot) \tag{2}$$

where, wro=2*pi*1750e6 and s(t) is the square wave signal output from the frequency divider 304.

Let the mixer's LO frequency be denoted as wlo, and the expected output signal from the I/Q mixer 306, neglecting the phase and the details related to complex vs. real mixer, may be modeled by Equation (3) below:

$$y(t)=x(t)\cdot\cos(wlot) \tag{3}$$

The expected output of interest is modeled by Equation (4) below:

$$y(t)=s(t)\cdot\cos(wt) \tag{4}$$

where, w=wro−wlo=167.3 MHz.

However, assuming the non-linearity model of the I/Q mixer 306 described in Equation (1) above, the actual output of the I/Q mixer 306 will contain a second order term in addition to y(t).

Applying Equation (1), a signal is modeled as z(t)=a1*y (t)+a2*y2(t) after neglecting the higher order terms.

Therefore, the second order non-linearity component may be expressed as a2*s2(t)cos 2 (wt). The only component of interest in z(t) would then be a2*s2(t) since 2w=335 MHz is far from the LPF cutoff frequency and is filtered by the LPF+HPF 308 filter.

H, the signal of interest near baseband is a2*s2(t), which is a square wave or equivalently, an on/off signal with a 50% duty cycle. However, due to the LPF+HPF 308 filter, the DC component of the square wave and the high order harmonics are attenuated. As a result, the baseband chip 201 will be provided with a low pass filtered square wave as an input.

Figure 4:
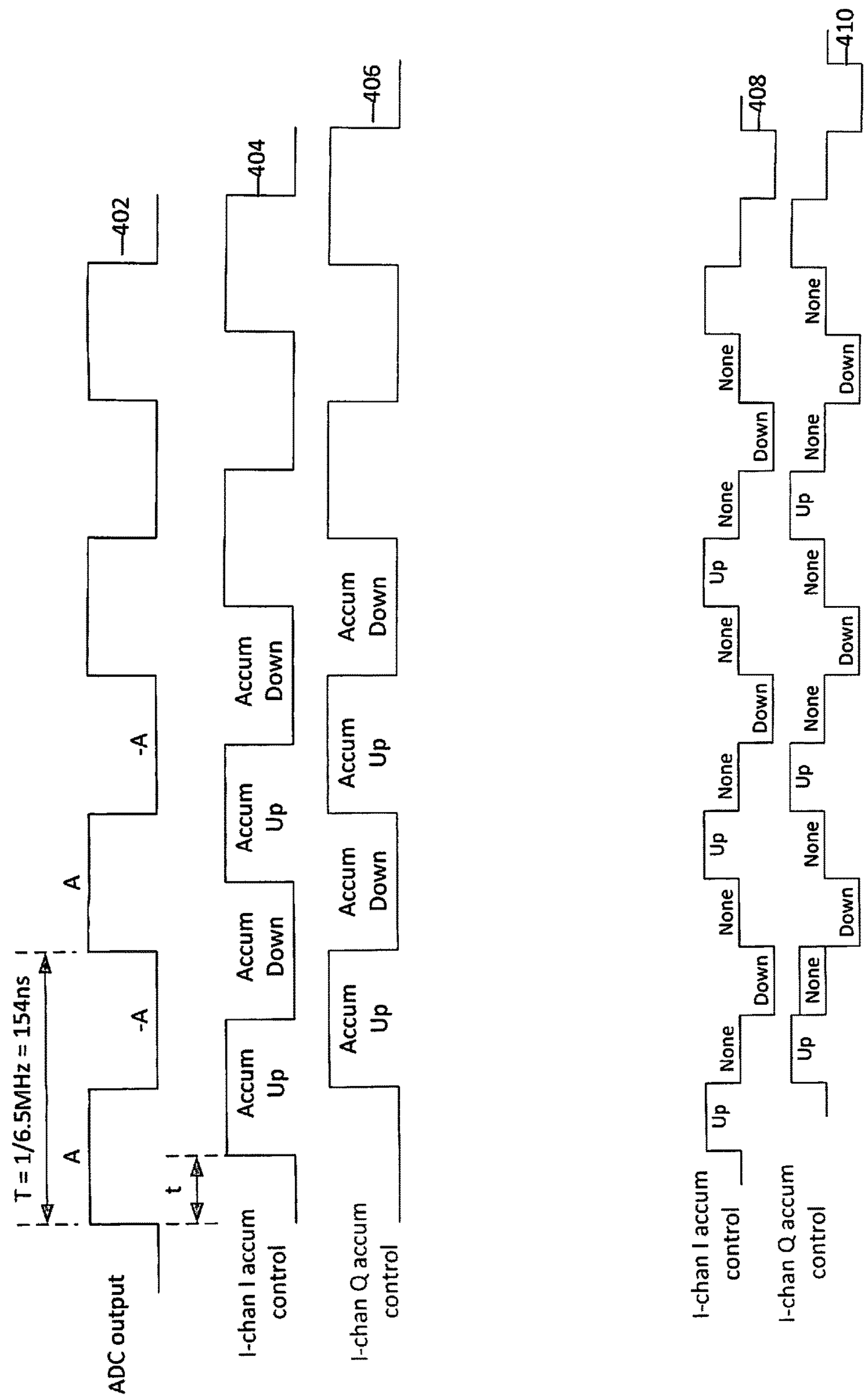
FIG. 4 illustrates a method of integrating digital signals, according to an embodiment of the present disclosure.

FIG. 4 illustrates a method of integrating digital signals, according to an embodiment of the present disclosure.

Figure 5:
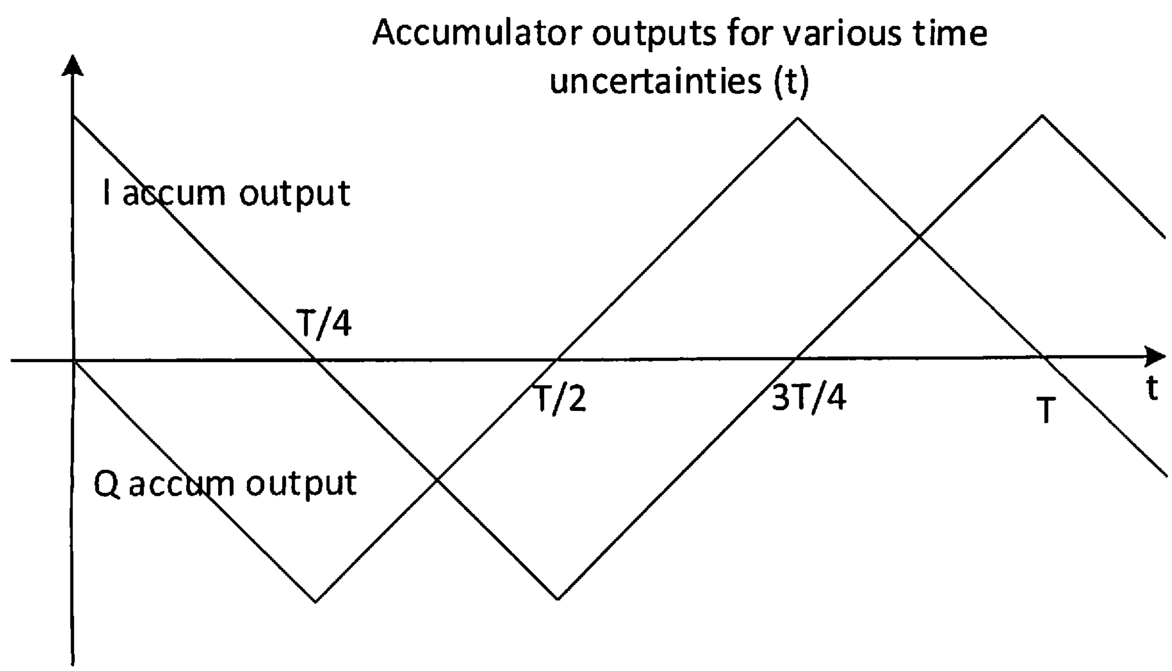
FIG. 5 illustrates a plot of I and Q accumulator outputs, according to an embodiment of the present disclosure.

Referring to FIGS. 4 and 5, the ADC output waveform 402, which is input to the baseband chip 201, is a signal represented as a zero-DC square wave with amplitude A. The requirement to provide a known phase of the received AM signal in the baseband chip 201 is avoided by having two accumulators that are offset by a quarter period (90 degree phase shift), and thereby deriving an amplitude measurement which is phase-independent as shown in FIG. 5, where the amplitude equal to magnitude (AM I)+magnitude (AM Q) is a constant and independent of phase.

FIG. 4 illustrates the timing error, denoted as t, between the first accumulator's phase and the signal of interest. The period of the 6.5 MHz square wave is denoted as T and is equal to 154 ns. The two accumulator outputs 404, 406 are phase shifted by T/4. In particular, an accumulator that sums up and down synchronously, yields an output of A*T. The up/down accumulator is adding and subtracting thereby effectively removing any DC component and providing rejection of low frequency noise such as flicker noise. The synchronous integrators may accumulate up during the high half-cycle portion of the clock and accumulate down during low half-cycle portion of the 6.5 MHz AM clock. The advantage of this accumulation method is to strongly reject a DC offset and low frequency noise appearing at the ADC outputs. The synchronous integrators may alternatively be implemented as accumulate up/none/down/none during successive ¼ cycles of the AM clock as shown in accumulator outputs 408 and 410. When using accumulator outputs 408 and 410, the number of operations per cycle of AM I plus AM Q is reduced from 12 operations to 8 add/subtracts per cycle of 6.5 MHz AM at an ADC sample rate of 52 MHz.

FIG. 5 shows the relationship between the output value of the accumulators and the time offset between the signal of interest and the first accumulator in a noise free setting. A quadrature pair of detectors acquire the phase and determine which one of the four groups (0, T/4), (T/4, T/2), (T/2, 3T/4), (3T/4, T) that the phase belongs in. Once the group is determined, the two accumulator outputs may be combined coherently. Because the coherently calculated amplitude may be either positive or negative, the calibration method keeps track if the error is positive or negative to force the amplitude to zero.

According to an embodiment of the present disclosure, a non-coherent combining in the last stage is executed which reduces computational complexity. In this approach the metric, X is modeled by Equation (5) below:

$$X=|X1|+|X2| \tag{5}$$

In a synchronous system, the objective function has positive and negative values, and the method seeks to find the zero crossing. In a synchronous combining technique, the objective function is zero when properly calibrated but may result in positive or negative values when not properly calibrated. As a result, the goal is to find a zero crossing. An alternate non-coherent combining method according to Equation (5) above may yield better calibration performance when compared to non-coherent combining as the DAC code approaches the optimum setting since the signal to noise ratio (SNR) of the signal of interest is low and therefore the measurement is biased by noise. The alternate method performs asynchronous coherent accumulation on two phase offset integrators, whose outputs are then non-coherently combined. A non-coherent accumulation technique may have lower performance in low signal to noise ratio environments. A hardware state machine may be used to implement the two methods of coherent and non-coherent combining of the synchronous integrator outputs.

Figure 6:
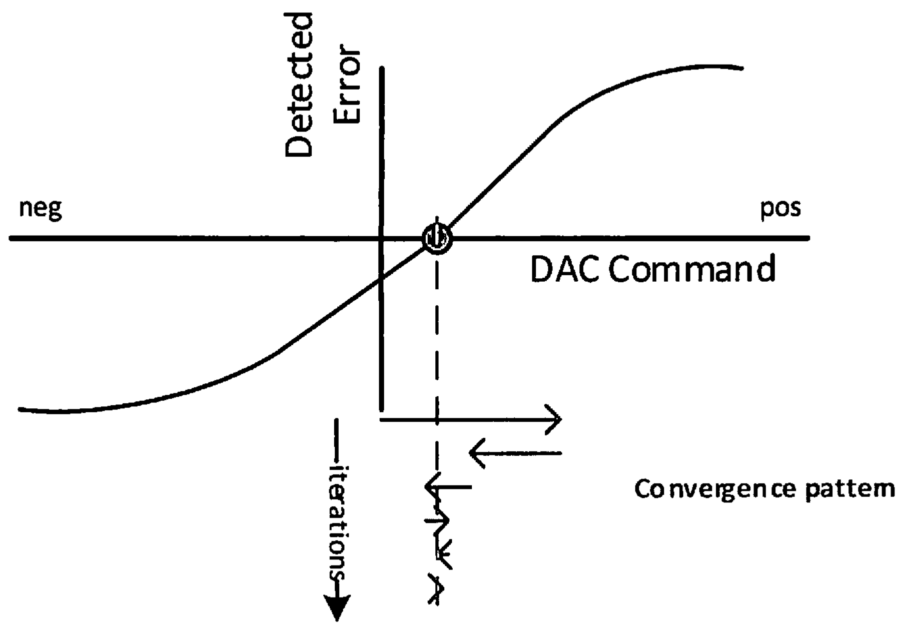
FIG. 6 illustrates a plot of digital to analog converter (DAC) commands vs. detected error, according to an embodiment of the present disclosure.

FIG. 6 illustrates a plot of digital to analog converter (DAC) commands vs. detected error, according to an embodiment of the present disclosure.

According to an embodiment of the present disclosure, a coherent combining method may be used to combine the two accumulator outputs. Referring to FIG. 6, the accumulator output metrics are signed (positive or negative) and therefore a binary search technique may be used to locate the zero crossing point which corresponds to the minimum detected error and the optimum DAC codes. The sign must be maintained in this method and requires the calculation of 4-quadrant phase. Pseudo code for executing the coherent combining method is shown below:

```
DAC_CODE = 0;
FOR (i=5: i>=0; i--)
IF (ACC_OUT_METRIC >= 0)
DAC_CODE = DAC_CODE - (1<<i);
ELSE
DAC_CODE = DAC_CODE + (1<<i);
```

Therefore, determining the sign of the accumulator output is sufficient to find the optimum DAC code.

Figure 7:
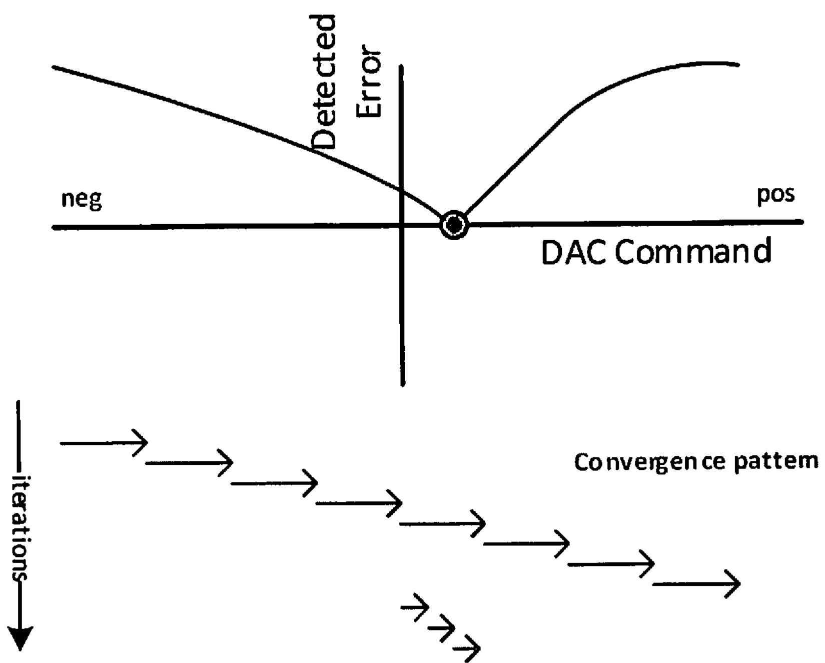
FIG. 7 illustrates another plot of digital to analog converter (DAC) commands vs. detected error, according to an embodiment of the present disclosure.

FIG. 7 illustrates another plot of digital to analog converter (DAC) commands vs. detected error, according to an embodiment of the present disclosure;

A sample objective function is shown in FIG. 7. The detected error shown in FIG. 7 is the accumulator output after non-coherent combining. FIG. 7 illustrates that non-coherent combining yields only positive values, the optimal DAC code yields a zero value and that larger errors from the optimal DAC code yields a larger combined value. While synchronous combining may benefit from monotonicity and use an efficient search technique, in the non-coherent combining technique, a coarse search followed by one or more fine searches is required in order to determine the optimal DAC code. The convergence shown in FIG. 7 illustrates a coarse search, followed by finer resolution searches.

When mixer 212 or mixer 214 is adjusted independent of the other, the optimal adjustment of the other mixer is no longer correct due to imperfect isolation of the signals in the complex mixers in the RF receiver chip 200. Therefore, the optimal I and Q DAC settings are determined by the minimum synchronous receiver amplitude point on a 2-dimensional surface, and this global minimum may be different from two independent 1-dimensional minimization functions.

Figure 8:
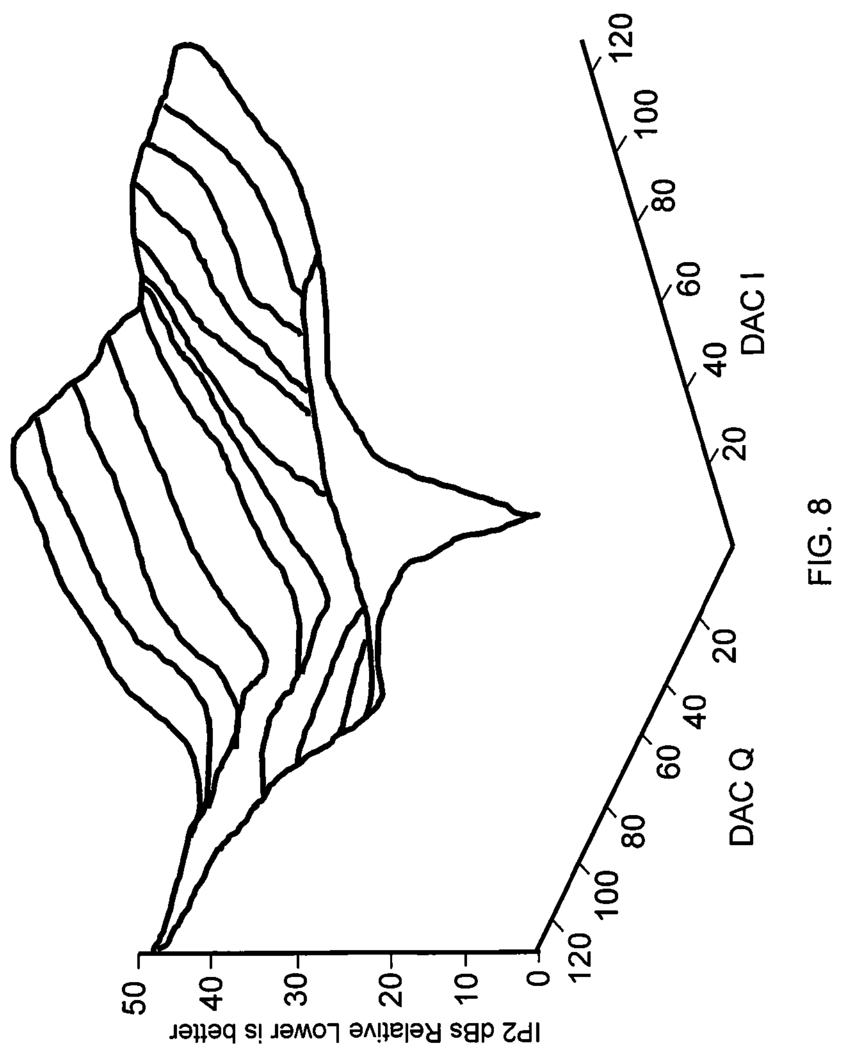
FIG. 8 illustrates a plot of I and Q DAC codes corresponding to I and Q mixer imbalance, according to an embodiment of the present disclosure.

FIG. 8 illustrates a plot of I and Q DAC codes corresponding to I and Q mixer imbalance, according to an embodiment of the present disclosure.

According to an embodiment of the present disclosure, the calibration method provides an efficient global search for optimal DAC settings which provide a DC bias voltage to I and Q mixers which minimizes the imbalance in the mixers in a GNSS receiver 119. Referring to FIG. 8, the results of the global search method is plotted. The amount of IP2 distortion product at 6.5 MHz in relative decibels is plotted against DAC I settings from 0 to 127 and DAC Q settings from 0 to 127.

The calibration method overcomes the problem of large memory and latency requirements needed for a comprehensive point-by-point, 2-dimensional search. A global search for optimal DAC settings may be simplified when the function is relatively smooth, which is usually the case for complex RF mixer cross-coupling. An IP2 function which is completely random with no discernable shape must be completely searched for all combinations of DAC I and DAC Q to find the lowest IP2. If the IP2 function is noiseless and has a negative gradient for all combinations of DAC I and DAC Q, then a gradient descent algorithm will determine the best IP2. An efficient gradient-descent algorithm may stop at a local minimum but never determine the global minimum. A two-step method which is more efficient than a global search will not converge to a wrong local minimum if the global shape is modestly smooth. The present method overcomes large-scale gradient reversals. The present method includes a two-step global search. The first search step is a coarse setting search followed by a fine setting second search step. The ratio of coarse setting search and fine setting search may be pre-established empirically through prior experimentation. The ratio of coarse setting search to fine setting search may include, but is not limited to, a ratio of 8. For each measurement point a pair of DAC settings is stored in memory. The resolution of the DAC (number of DAC bits) may vary. The step size for successive DACs settings may also vary. The length of synchronous integration may also be adjusted differently between coarse setting search and fine setting search. The number of sub-searches (fine settings) may also be larger than 2 while using larger sub-steps. A 2-step example of an efficient global DAC setting search method is described below in the following operations:

Initialize DAC *I* 220 setting=0 and DAC *Q* 222 setting=0.

Create two tables in memory corresponding to the coarse and fine settings. The table for the coarse settings includes 128 memory locations of 8 bits each. The two indices to the memory locations are the DAC I 220 setting value and the DAC Q 222 setting value. The memory cell entries are the final adjusted amplitude values from the GNSS receiver 119.

Determine the data required to fill the coarse setting table.

Measure the GNSS receiver 119 amplitude and store the value of the amplitude in the table location corresponding to coarse index=(0, 0). The amplitude will correspond to a DAC Q 222 setting of 0 and a DAC I 220 setting of 0.

Increment the DAC Q 222 setting by steps of 8 from value 0 to 127 while storing each measured amplitude for the 0 index DAC I 220 into the coarse table indices (0, 0 to 7).

Increment DAC I 220 by 8 and repeat step b until the DAC I 220 setting=127. For each setting of DAC I 220, fill in the appropriate row of the coarse table by each value of receiver amplitude measured for DAC Q 222 from 0 to 15*8 in steps of 8.

Search for the best (lowest) amplitude value in the coarse table and store the indices. The stored indices are referred to as indices C_I and C_Q.

Initialize the fine setting memory table. The memory space for the course setting table may be reused for the fine setting table. Initialize the DACs to DAC I 220=16*C_I−8 and DAC Q 222 to 16*C_Q−8. Thus, the fine global search starts at ½ coarse step below the best coarse location for both DAC I 220 and DAC Q 222 settings assuring the search method won't miss the fine-steps best settings because the coarse value may be have an error equal to +/−½ step.

Determine the data required to fill the fine setting table.

Measure the GNSS receiver 119 amplitude and store the value of the amplitude in the table location corresponding to fine index=(0, 0).

Increment DAC Q 222 by steps of 1 from 0 to 15 and store each amplitude in the fine table.

Increment DAC I 220 by steps of 1 from 0 to 15 and for each step repeat b. above, storing the amplitude values in the appropriate index (DAC I, DAC Q) location.

When the fine table entry is completed, determine the index pair (I Best, Q Best) with the lowest amplitude.

Set the final global optimum values as DAC Global=8*Course Offset+Best Fine (for I and Q)

Figure 9:
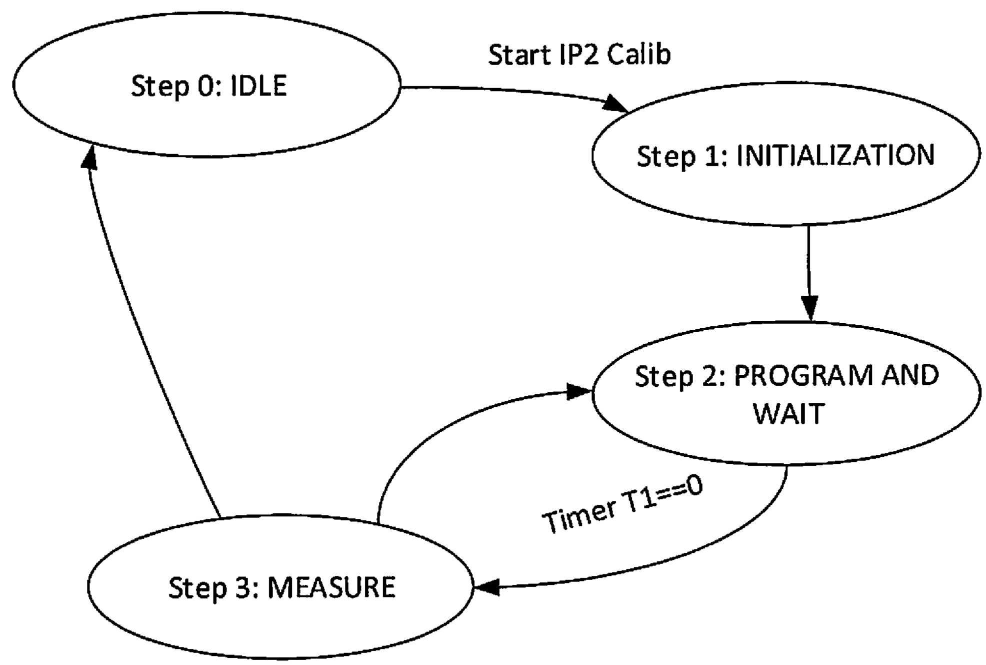
FIG. 9 illustrates a state machine for a method of measuring I and Q mixer imbalance in a GNSS receiver, according to an embodiment of the present disclosure.

FIG. 9 illustrates a state machine for a method of measuring I and Q mixer imbalance in a GNSS receiver, according to an embodiment of the present disclosure.

Referring to FIG. 9, at Step 0 a starting DAC code is determined for each of the I and Q paths. At steps 1-4 multiple values of I and Q DAC codes are determined to cover the range of all possible DAC code combinations. At Step 1, coherent up/down or up/none accumulation is performed on synchronous integrators 236, 238, 246 and 248 until a set duration of accumulation is complete. At Step 2, when the accumulation is completed, perform non-coherent combining on accumulator values from synchronous integrators 236, 246 and from synchronous integrators 238, 244. At Step 3, determine the next value of the DAC code on either the I or Q paths and repeat Steps 1 and 2. At Step 4, after completing Steps 1 and 2 using all of the I and Q DAC codes with a coarse resolution, Steps 1 to 3 are performed using a fine resolution of I and Q DAC codes in a range around the I and Q DAC codes that produced the lowest combined value of I and Q mixer imbalance.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. An electronic device comprising:

a processor configured to:

downconvert, by an input/output (I/O) mixer including a first multiplier and a second multiplier, a modulated radio frequency wave to an intermediate frequency, where the modulated radio frequency wave is input to first inputs of the first multiplier and the second multiplier, and where an in-phase signal and a quadrature phase signal based on a square wave are input to second inputs of the first multiplier and the second multiplier, respectively, wherein a first digital to analog converter (DAC) receives a first signal based on the square wave and outputs the in-phase signal and a second DAC receives a second signal based on the square wave and outputs the quadrature phase signal;

filter the downconverted modulated radio frequency wave; and convert the filtered downconverted modulated radio frequency wave to a digital signal.

2. The electronic device of claim 1, wherein downconverting the modulated radio frequency wave comprises providing DC bias voltages from the first and second DACs to corresponding mixers.

3. The electronic device of claim 2, further comprising determining DAC codes for the first DAC providing a first DC bias voltage to a first mixer and the second DAC providing a second bias voltage to a second mixer, wherein the determined DAC codes minimize the imbalances in the first mixer and the second mixer.

4. The electronic device of claim 3, wherein determining the DAC codes for the first DAC and the second DAC which minimizes the imbalances in the first mixer and the second mixer comprises performing a global search.

5. The electronic device of claim 3, wherein determining the first and second DAC codes comprises:

setting the first and second DAC codes to zero, measuring and storing the mixer imbalance value;

incrementing the first and second DAC codes by an integer value of at least one;

repeating the setting, measuring and storing until a maximum DAC code is reached;

determining a DAC code range that results in a minimized mixer imbalance;

repeating the setting, measuring and storing within the determined DAC code range using an increment of one; and determining the first and second DAC codes associated with the minimum mixer imbalance value.

6. The electronic device of claim 3, wherein the electronic device is a global navigation satellite system (GNSS) receiver and the GNSS receiver is calibrated using the determined DAC codes, and further comprising a temperature measuring device, wherein the calibration method of the GNSS receiver is executed when a temperature of the GNSS receiver changes more than a predefined threshold.

7. The electronic device of claim 6, wherein a frequency of a radio frequency wave of the modulated radio frequency wave is outside a band of a radio frequency input signal of the GNSS receiver.

8. The electronic device of claim 1, further comprising driving the square wave by a reference frequency oscillator which decreases a pin count on at least one of a baseband integrated circuit (BBIC) and a radio frequency integrated circuit (RFIC).

9. The electronic device of claim 1, wherein the square wave is out of phase with another square wave.

10. A method comprising:

downconverting, by an input/output (I/O) mixer including a first multiplier and a second multiplier, a modulated radio frequency wave to an intermediate frequency, where the modulated radio frequency wave is input to first inputs of the first multiplier and the second multiplier, and where an in-phase signal and a quadrature phase signal based on a square wave is input to second inputs of the first multiplier and the second multiplier, respectively, wherein a first digital to analog converter (DAC) receives a first signal based on the square wave and outputs the in-phase signal and a second DAC receives a second signal based on the square wave and outputs the quadrature phase signal; and filtering the downconverted modulated radio frequency wave.

11. The method of claim 10, wherein downconverting the modulated radio frequency wave comprises providing DC bias voltages from the first and second DACs to corresponding mixers.

12. The method of claim 11, further comprising determining DAC codes for the first DAC providing a first DC bias voltage to a first mixer and the second DAC providing a second DC bias voltage to a second mixer, wherein the determined DAC codes minimize the imbalances in the first mixer and the second mixer.

13. The method of claim 12, wherein determining the first and second DAC codes comprises:

setting the first and second DAC codes to zero, measuring and storing the mixer imbalance value;

incrementing the first and second DAC codes by an integer value of at least one;

repeating the setting, measuring and storing until a maximum DAC code is reached;

determining a DAC code range that results in a minimized mixer imbalance;

repeating the setting, measuring and storing within the determined DAC code range using an increment of one; and determining the first and second DAC codes associated with the minimum mixer imbalance.

14. The method of claim 13, wherein a global navigation satellite system (GNSS) receiver is calibrated using the determined DAC codes.

15. The method of claim 14, wherein the calibration of the GNSS receiver is executed when a temperature of the GNSS receiver changes more than a predefined threshold.

16. The method of claim 14, wherein a frequency of a radio frequency wave of the modulated radio frequency wave is outside a band of a radio frequency input signal of the GNSS receiver.

17. The method of claim 10, wherein another square wave is generated on a radio frequency integrated circuit (RFIC) and the square wave is generated on a baseband integrated circuit (BBIC), wherein the another square wave and the square wave are generated by a reference frequency oscillator, and the another square wave and the square wave are out of phase with each other.

18. The method of claim 10, further comprising:

converting the filtered downconverted modulated radio frequency wave to a digital signal; and integrating the digital signal, wherein integrating the digital signal comprises accumulating the digital signal over a programmable period of time.

19. A chipset for receiving global navigation satellite system (GNSS) signals, the chipset configured to:

downconvert, by an input/output (I/O) mixer including a first multiplier and a second multiplier, a modulated radio frequency wave to an intermediate frequency, where the modulated radio frequency wave is input to first inputs of the first multiplier and the second multiplier, and where an in-phase signal and a quadrature phase signal based on a square wave are input to second inputs of the first multiplier and the second multiplier, respectively, wherein a first digital to analog converter (DAC) receives a first signal based on the square wave and outputs the in-phase signal and a second DAC receives a second signal based on the square wave and outputs the quadrature phase signal; and filter the downconverted modulated radio frequency wave.

20. The electronic device of claim 1, wherein the processor is configured to generate another square wave in a first integrated circuit, and generate the square wave in a second integrated circuit.

* * * * *